March 11, 1930.　　　J. E. PFLUEGER　　　1,750,243
COMBINED HOOK AND WEED GUARD
Filed June 6, 1925
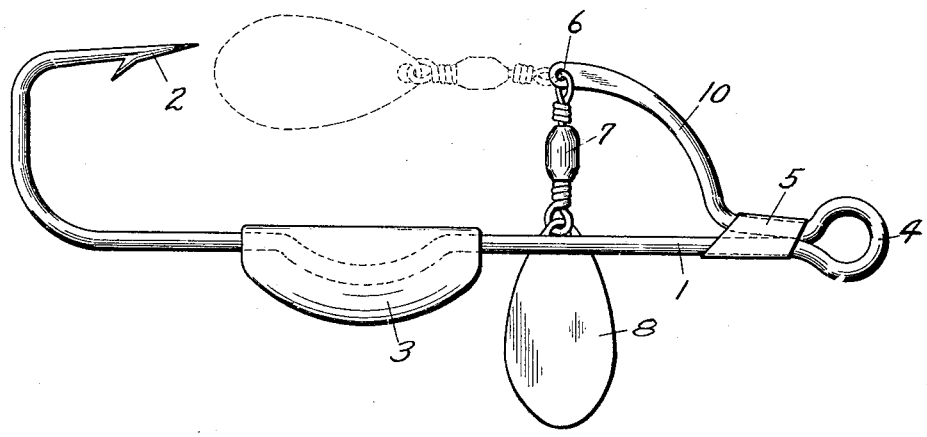
INVENTOR.
Joseph E. Pflueger
BY
ATTORNEY.

Patented Mar. 11, 1930

1,750,243

UNITED STATES PATENT OFFICE

JOSEPH E. PFLUEGER, OF AKRON, OHIO, ASSIGNOR TO THE ENTERPRISE MANUFACTURING COMPANY, OF AKRON, OHIO, A CORPORATION OF OHIO

COMBINED HOOK AND WEED GUARD

Application filed June 6, 1925. Serial No. 35,358.

This invention relates to a combined fish hook and weed guard in which the weed guard is formed as a rigid arm from the same wire which constitutes the hook, and to the end of which weed guard is attached a spinner or spoon which is thereby arranged so that it will rotate or spin adjacent the point or barb of the hook and thus provide an additional attraction or lure.

The rigid weed guard possesses advantages over the weed guards of the prior art as it forms a positive guard and cannot be bent or distorted.

In the drawing is shown one form of the invention, the active position of the spinner being shown in dotted lines.

The shank of the hook is indicated by the numeral 1 and the point or barb by the numeral 2. At a midway point on the shank is arranged the weight or keel 3. The eye of the hook is indicated at 4 and is formed by bending the wire so that it lies adjacent the shank of the hook, at which point it may be secured by any suitable means, as by soldering, although this it not essential, as indicated at 5. The end 10 of the wire is bent upwardly and outwardly until it lies opposite the point of the hook where it may be flattened slightly and provided with a hole 6 through which is received the swivel 7 for the spoon 8.

In trolling or casting, the spoon will assume the dotted line position of the drawing and will rotate adjacent the point of the hook but not overlying or in contact with it. The arm 10 serves two purposes; it is an effective weed guard and it also serves as a rigid mounting for the rotating spoon. By forming the arm 10 from the wire of the hook, the manufacture of the device is simplified and a rigid weed guard and spinner support is provided.

In carrying out the invention it is not necessary that the details of the showing be followed closely as changes and modifications may be made in the scope of the invention.

What is claimed is:

1. A fish hook comprising a single wire having one end bent and formed as the hook, the other end being bent upon itself to form an eye, an integral extension on the hook curved upwardly therefrom and extending toward the hook but spaced therefrom so as to form a rigid weed guard, and a spinner pivotally connected to the end of the extension and adapted to rotate in the space between the extension and the hook.

2. A fish hook comprising a single wire having one end bent and formed as the hook, the other end being bent upon itself to form an eye, an integral extension on the hook curved upwardly therefrom and extending toward the hook but spaced therefrom so as to form a rigid weed guard and a lure attached to the extension and lying in the space between the extension and the hook.

JOSEPH E. PFLUEGER.